(12) United States Patent
Ortmann

(10) Patent No.: US 11,435,747 B2
(45) Date of Patent: Sep. 6, 2022

(54) SYSTEM COMPRISED OF A FLOOR PROCESSING DEVICE, AN OBJECT LOCATED IN THE ENVIRONMENT OF THE FLOOR PROCESSING DEVICE, A DETECTION DEVICE, AND A CONTROL DEVICE

(71) Applicant: Vorwerk & Co. Interholding GmbH, Wuppertal (DE)

(72) Inventor: Roman Ortmann, Duisburg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 264 days.

(21) Appl. No.: 16/865,632

(22) Filed: May 4, 2020

(65) Prior Publication Data
US 2020/0363812 A1    Nov. 19, 2020

(30) Foreign Application Priority Data

May 13, 2019   (DE) ...................... 10 2019 112 433.6

(51) Int. Cl.
*G05D 1/02*    (2020.01)
*G05D 1/00*    (2006.01)
*G06V 20/13*   (2022.01)
*G06V 20/64*   (2022.01)

(52) U.S. Cl.
CPC ......... *G05D 1/0219* (2013.01); *G05D 1/0022* (2013.01); *G06V 20/13* (2022.01); *G06V 20/64* (2022.01); *G05D 2201/0215* (2013.01)

(58) Field of Classification Search
CPC .............. G05D 1/0219; G05D 1/0022; G05D 2201/0215; G05D 1/0242; G05D 1/0255; G05D 1/0259; G05D 1/0276; G05D 1/028; G06V 20/13; G06V 20/64; A47L 5/12; A47L 9/2815; A47L 11/24; A47L 11/40; A47L 11/4094; A47L 2201/00; A47L 2201/04; E05F 15/40; E05F 15/73; E05F 15/77; G05B 19/4061; G05B 2219/39091; G05B 2219/39094
See application file for complete search history.

(56) References Cited

U.S. PATENT DOCUMENTS 5,040,331 A * 8/1991 Merendino ............. E05F 15/63
                                              49/357
2018/0192845 A1* 7/2018 Gu ......................... B25J 13/086

* cited by examiner

*Primary Examiner* — Bao Long T Nguyen
(74) *Attorney, Agent, or Firm* — Collard & Roe, P.C.

(57) ABSTRACT

A system is comprised of a floor processing device, an object located in the environment of the floor processing device, which has a partial object area and a displacement device for automatically displacing the partial object area, a detection device, which is suitable for detecting a presence of the floor processing device in a detection area of the detection device, and a control device for generating a control command for the displacement device as a function of the detection result of the detection device. In order to prevent a collision with the floor processing device given automatic displacement devices of objects, the control command is suitable for deactivating the displacement device, thereby preventing a displacement of the partial object area even if the floor processing device is present in the detection area.

8 Claims, 2 Drawing Sheets

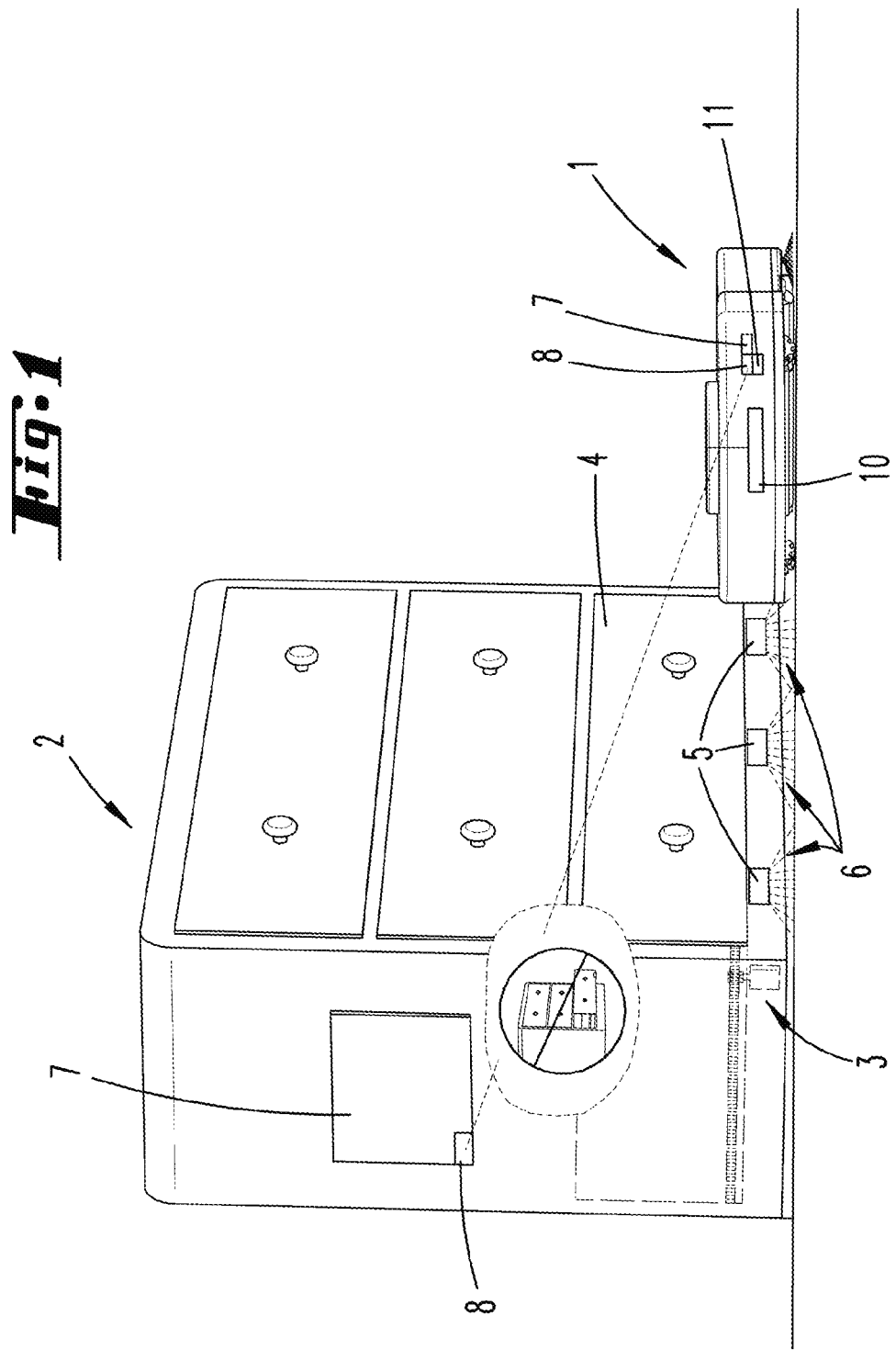

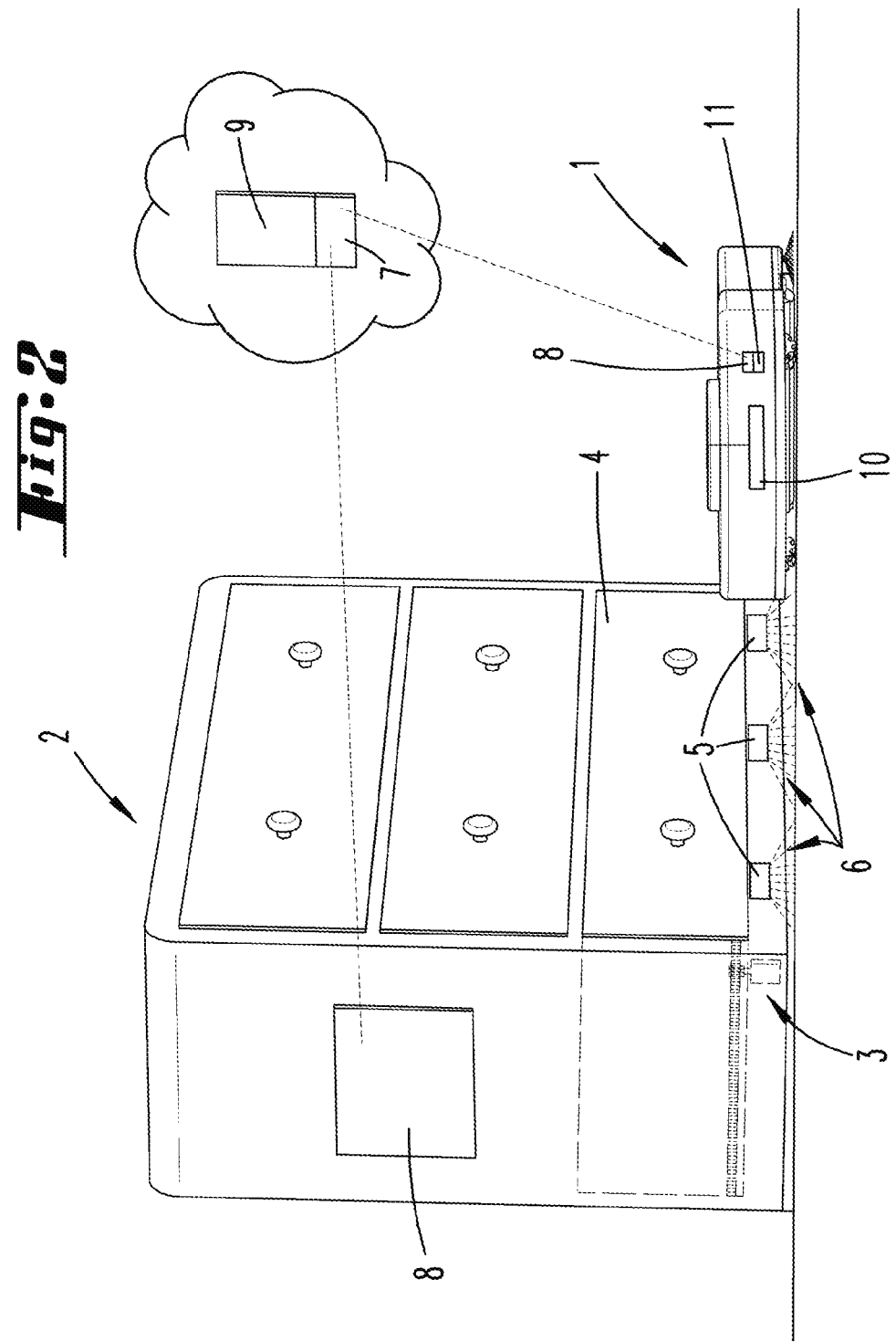

SYSTEM COMPRISED OF A FLOOR PROCESSING DEVICE, AN OBJECT LOCATED IN THE ENVIRONMENT OF THE FLOOR PROCESSING DEVICE, A DETECTION DEVICE, AND A CONTROL DEVICE

CROSS REFERENCE TO RELATED APPLICATIONS

Applicant claims priority under 35 U.S.C. § 119 of German Application No. 10 2019 112 433.6 filed May 13, 2019, the disclosure of which is incorporated by reference.

BACKGROUND OF THE INVENTION

1. Field of the Invention

The invention relates to a system comprised of a floor processing device, an object located in the environment of the floor processing device, which has a partial object area and a displacement device for automatically displacing the partial object area, a detection device, which is suitable for detecting a presence of the floor processing device in a detection area of the detection device, and a control device for generating a control command for the displacement device as a function of the detection result of the detection device.

2. Description of the Related Art

For example, floor processing devices of the aforementioned kind are known as cleaning devices such as vacuum cleaners, mopping devices or the like, or also as polishing devices, lawnmowers, or the like.

Also known are objects with automatic displacement devices, for example door openers for closet or room doors, wherein the displacement device serves to automatically open a partial object area on demand. The displacement device has allocated to it a detection device, which can detect a movement in a detection area of the detection device, for example a movement of a moved body part of a user or also of a floor processing device that is manually moved by a user or moves automatically. For example, the detection device allocated to the displacement device can be an acoustic or optical detection device, which operates by means of ultrasound or light. In this way, for example, a user of the object is able to send a signal for opening a drawer or door by moving his or her foot.

The disadvantage to the aforementioned systems is that other moved objects, for example a floor processing device, the movement of which can likewise be detected by a detection device of the system, also trigger a displacement of the displaceable partial object area. For example, when an automatically moving floor processing device traverses the detection area of the detection device, the control device of the system outputs a control command for activating the displacement device of the object, which then leads to an undesired displacement of the partial object area. In particular, it is possible that this will cause the floor processing device to become jammed or damaged by the displaced partial object area.

SUMMARY OF THE INVENTION

Proceeding from the aforementioned prior art, it is thus the object of the invention to prevent any impairment or damage to a floor processing device via automatically displaceable partial object areas.

In order to achieve the aforementioned object, it is proposed that the control command for the displacement device be suitable for deactivating the displacement device, thereby preventing a displacement of the partial object area even if the floor processing device is present in the detection area.

According to the invention, the system is now set up to turn off the displacement device for the displaceable partial object area, even in a case where a floor processing device drives into the detection area of the detection device or moves toward the displaceable partial object area. For example, while the detection device of the system does detect the presence of a floor processing device in the environment of the object, in particular its movement toward the object, it ensures that no automatic displacement of the partial object area takes place, so as to protect the floor processing device against damage by the moved partial object area. The control command of the control device deactivates the displacement device, so that the latter can no longer displace the partial object area of the object, specifically independently of whether a floor processing device is traversing the detection area of the detection device or a user is performing a hand and/or foot movement for displacing the partial object area, for example. The detection device preferably has a detection area that spans a partial area of a floor surface on which the floor processing device is moving back and forth, so that the detection device can determine a movement by the floor processing device in this detection area. The detection device can have an ultrasound sensor, magnetic sensor, optical sensor, or others.

The detection device of the system can be a local detection device of the object, but alternatively also an external detection device, which preferably is integrated into the system according to the invention via a home communications network. The control device of the system can likewise be a local control device of the floor processing device, or alternatively also a control device external to the floor processing device, for example representing a separate participant in a home communications network.

In particular, the floor processing device and the object can have corresponding data communications devices for wirelessly communicating with each other, and/or that the system have a communications network with an access point, wherein the access point and a data communications device of the floor processing device and/or object are set up to communicate with each other via a wireless communications link. As a consequence, the system can be designed for a differently configured communication between the floor processing device and the object. In a first embodiment, the floor processing device and the object can communicate with each other directly via corresponding data communications devices, so that a control device of the floor processing device can transmit a control command directly to the displacement device of the object, which deactivates the displacement device. In another embodiment, the system can have a communications network that integrates the data communications devices of one or several floor processing devices and one or several objects as participants. This communications network has an access point at which the data communications devices can transmit information, and from which the data communications devices can receive information. Communication between one floor processing device and an object of the network thus does not take place directly, but via the access point of the network. For example, a data communications device of the floor processing device and/or the object can be a WLAN module, a Bluetooth module, a ZigBee module, or the like. A protocol compatibility must basically be provided between the data communications devices of the system.

The object can have a local access point, or the system can have a central access point, with which a data communications device of the floor processing device can be connected, so as to transmit a control command to the displacement device. The access point of the communications network can thus either be a local access point of the object, or a central access point of the system, for example which is allocated to a server of the home network. The data communications device of the floor processing device can link with this local or central access point, so as to transmit the control command to the displacement device of the object. In the event that the object has its own, local access point, the data communications device of the floor processing device can link directly with the access point of the object and deactivate the displacement device by transmitting a control command. Given a central access point, the data communications device of the floor processing device checks in with the central access point, and transmits control commands via the shared home communications network, for example via WLAN, Bluetooth or ZigBee, to the displacement device of the objects so as to deactivate the latter.

In the event that the control device is an external device of the system, which in particular is not an element of the floor processing device, the control device can be part of a central server, for example, to which one or several floor processing devices transmit information. In particular, this information can indicate a current operating status of the floor processing device. The control device receives this information, and thereupon generates a control command for the displacement device of the object, which deactivates the displacement function, so that the partial object area is not displaced even though a floor processing device is present in the detection area of the detection device.

The control command of the control device can contain a time allowance denoting a period of time for which the displacement device is deactivated. In this embodiment, the displacement device is only deactivated for the predefined period of time, so that once this period of time has elapsed, an automatic reactivation takes place, and the displacement device can again displace the partial object area in a conventional manner if a movement is detected in the detection area of the detection device. Alternatively, however, it is also possible for the control device of the system, for example a local control device of the floor processing device, to transmit a control command to the displacement device of the object, with which the displacement device can again be activated, and the partial object area can once again be automatically displaced.

In addition, parameters for adjusting the displacement device can be transmitted via the data communications device of the object. Apart from deactivation and reactivation, for example, such a parameter for the displacement device can involve an opening force exerted by the displacement device. Furthermore, it is also possible to transmit information to the detection device of the system, specifically for example via a data communications device allocated to the detection device. For example, a transmitted parameter can be a detection accuracy of the detection device to be adjusted. If the object with the displacement device has both the detection device and control device, the parameters to be adjusted can be transmitted as a whole by a data communications device of the floor processing device to the data communications device of the object, so as to make the corresponding adjustments to the displacement device and/or the detection device.

Within the meaning of the invention, the object of the system can be a door or a furniture item. In addition, the displaceable partial object area of this object can then be a door leaf, a flap, or a drawer. The displacement device of the object thus assumes the function of a door opener, drawer opener or the like.

In addition, it can be provided that the floor processing device have a sensor for detecting objects in the environment of the floor processing device. For example, the sensor can be an obstacle sensor, which measures distances to objects present in the environment of the floor processing device. For example, such sensors can be ultrasound sensors or optical sensors. Furthermore, the floor processing device can also be set up to receive a data communications signal from an object, which provides information about whether the object has a displacement device for a displaceable partial object area.

In particular, the control device of the system can be set up especially for using the object data recorded by the sensor of the floor processing device to determine whether the object has a displacement device, and in the event that the object has a displacement device, transmit a control command for deactivating the displacement device to the object. In this embodiment, the control device of the system can specifically transmit one control command for only one of several objects present in the environment, so that the additional, unaffected objects of the system continue to have an activated displacement device. Only the displacement device of the object in whose immediate vicinity the floor processing device is located is here preferably deactivated. Alternatively, a central control device of the system can have allocated to it a sensor for detecting objects, or a central storage device, which stores information about the sites within the environment where objects with displaceable partial object areas are located, so that the control device, upon detecting that a floor processing device is approaching an object with a displacement device, transmits a control command to precisely this object, whose contents call for deactivating the displacement device, thereby preventing a displacement of the partial object area while the floor processing device is approaching the object.

Finally, it is proposed that the floor processing device be an automatically moving floor processing device, wherein the floor processing device has a navigation device, which is set up to generate an area map based upon object data of detected objects. While the invention essentially also functions in a system having a floor processing device that is manually guided by a user, the invention is all the more advantageous in automatically moving floor processing devices, since no user might be present in the environment of the object to prevent a collision between a partial object area and the floor processing device. The automatically moving floor processing device has a preferably self-generated area map, which notes an outline of the environment along with objects present therein. Furthermore, the area map can additionally contain information about whether the objects present in the environment have displaceable partial object areas, which can be automatically displaced by a displacement device. If the floor processing device is moving on a predefined movement path through the environment, the control device of the system, in particular a separate control device of the floor processing device, can transmit a control command for deactivating the displacement device in advance to an object in whose environment the floor processing device is moving. This advantageously makes it possible to avoid a collision between displaced partial object areas and the floor processing device. After the floor processing device has subsequently been removed from the object, the control device can then once more transmit a control command to the displacement device, with which the displacement device is again activated. Alternatively, it is possible for the control command transmitted to the displacement device at the outset to already contain a time allowance denoting a period of time for which the displacement device is to be deactivated.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a system with a floor processing device and an object, which has an automatically displaceable partial object area; and FIG. 2 shows another embodiment of a system according to the invention.

DETAILED DESCRIPTION OF PREFERRED EMBODIMENTS

FIG. 1 shows a system comprised of a floor processing device 1 and an object 2. The floor processing device 1 is here an automatically moving cleaning device, which has a navigation device 11 for automatic navigation and self-localization in the environment. The navigation device 11 has allocated to it a sensor 10 for detecting objects 2 in the environment. Here, for example, the sensor 10 is part of a distance measuring device, which can measure distances to objects 2 in the environment. Based upon the measurement data of the sensor 10, the navigation device 11 can generate an area map, which contains objects 2 and other obstacles in the environment of the floor processing device 1. In addition, the floor processing device 1 has a data communications device 8, for example a WLAN module or Bluetooth module.

The depicted system can have additional (not shown) floor processing devices 1 and/or additional objects 2. The type of floor processing devices 1 is not limited to the depicted embodiment; rather, the floor processing device 1 can alternatively be a floor processing device 1 manually guided by a user. Cleaning devices, polishing devices, grinding devices, mowing devices or the like are possible as the floor processing devices 1, for example. However, floor processing devices 1 can also be understood as movable or automatically moving service devices, in particular transport devices or monitoring devices, which perform no actual floor processing operations. The depicted embodiments of the invention remain unaffected by the latter.

For example, the object 2 present in the environment of the floor processing device 1 is here a chest of drawers with a plurality of drawers, which are displaceable partial object areas 4 of the object 2. The lowermost drawer in the illustration is exemplarily equipped with a displacement device 3, which can be automatically activated by a control device 7 of the object 2. For example, the displacement device 3 here has a linear drive, which can push the drawer, i.e., the displaceable partial object area 4, out of the body of the chest of drawers, so as open the chest of drawers for the user. Several detection devices 5 are arranged in a lower part of the object 2, here for example ultrasound sensors or infrared sensors, the detection areas 6 of which are downwardly directed toward a floor surface proceeding from the detection devices 5. A user of the object 2 can usually open the displaceable partial object area 4 by moving his or her foot into the detection area 6 of one of the detection devices 5, for example, whereupon the detection device 5 transmits a detection signal to the control device 7 of the object 2. The control device 7 evaluates the detection signal and recognizes that a movement was detected in the detection area 6 of the detection device 5. The control device 7 thereupon generates a control command for the displacement device 3, so as to prompt the displacement device 3 to displace the partial object area 4 at least partially out of the object 2, so that the drawer is open in the present example.

To prevent a floor processing device 1 entering into the detection area 6 of a detection device 5 from likewise being able to trigger a displacement of the partial object area 4, which then could potentially result in the floor processing device 1 becoming damaged or jammed, the floor processing device 1 is set up to notify the control device 7 of the object 2 that the displacement device 3 is not to be activated. For this purpose, the floor processing device 1 has a control device 7, which generates a control command for the object 2 that is suitable for deactivating the displacement device 3 of the object 2, thereby preventing any displacement of the partial object area 4 even if the floor processing device 1 drives into a detection area 6 of a detection device 5 of the object 2. The control device 7 of the floor processing device 1 can have the control command transmit a stipulated period of time for which the displacement device 3 of the object 2 is to be deactivated. The control device 7 of the floor processing device 1 can calculate this period of time based on an anticipated time for which the floor processing device 1 will be staying in the area of the detection devices 5, i.e., as a function of the period of time for which there exists a possible risk of collision between the floor processing device 1 and the displaceable partial object area 4.

Another embodiment of the invention can provide that the control device 7 of the floor processing device 1 access an area map of the environment, which also serves as the navigation basis for the navigation device 11. The control device 7 of the floor processing device can then, for example given a predetermined movement path of the floor processing device 1 through the environment, ascertain in advance that and potentially when the floor processing device 1 is driven into a detection area 6 of a detection device 6. The area map preferably has information allocated to the objects 2 as to whether the respective object 2 has a displaceable partial object area 4, which could collide with the floor processing device 1. The control device 7 of the floor processing device 1 can then transmit a control command to an object 2 with a displaceable partial object area 4 in advance, which deactivates the displacement device 3 of the respective object 2.

Regardless of an area map of the floor processing device 1, for example even if the floor processing device 1 is a floor processing device 1 manually guided by a user, a sensor 10 of the floor processing device 1 approaching an object 2 could also detect whether the object 2 has a displacement device 3. For example, the data communications device 8 of the floor processing device 1 can receive information from a corresponding data communications device 8 of the object 2 as to whether the object 2 has a displacement device 3 for a partial object area 4. In one embodiment, for example, the object 2 can have an optical code, which can be read out by the sensor 10 of the floor processing device 1 and delivers a reference to the displaceable partial object area 4. The floor processing device can alternatively also transmit a query via wireless data communication to a data communications device 8 of the object 2, which is answered with a corresponding response. In this case, for example, the object 2 can have an RFID chip, which when stimulated by a query signal of the floor processing device 1 outputs a corresponding response signal, which can in turn be evaluated by the control device 7 of the floor processing device 1.

The data communications device 8 of the floor processing device 1 can transmit a control command to the data communications device 8 of the object 2, so as to deactivate the displacement device 3. In one embodiment, it is also possible for the data communications device 8 of the object 2 to provide a local access point (not shown on FIG. 1), to which the data communications device 8 of the floor processing device 1 can report, in particular with an ID, if necessary additionally using a password. In this embodiment, not just any floor processing device 1 or some other device can transmit a control command to the data communications device 8 of the object 2, but rather only those processing devices 1 authorized to do so. This makes it possible to prevent the displacement device 3 of the object 2 from being undesirably deactivated.

FIG. 2 shows an additional exemplary embodiment of a system according to the invention, there with a floor processing device 1, an object 2 and a central access point 9 of the system, for example which is here integrated into a server. A control device 7 is allocated to the central axis point 9. Both the data communications device 8 of the object 2 and the data communications device 8 of the floor processing device 1 have a wireless communications link with the access point 9 of the system, so as to carry out wireless data communication, for example via WLAN, ZigBee, or the like. In order to deactivate the displacement device 3 of the object 2, for example, the data communications device 8 of the floor processing device 1 in this exemplary embodiment initially transmits a control command to the central access point 9, whereupon the access point 9 relays the control command to the data communications device 8 of the object 2. Alternatively, it is also possible for the floor processing device 1 to initially only transmit information about a current operating status and/or whereabouts of the floor processing device 1 to the access point 9, and for the separate control device 7 of the access point 9 to thereupon formulate a control command for the displacement device 3 of the object 2, such that the function of the displacement device 3 can be deactivated. In this embodiment, the control device 7 of the access point 9 can have an area map, in which the locations of objects 2 with displaceable partial object areas 4 are recorded, so that the control device 7 can determine which objects 2 exist in a movement path of the floor processing device 1.

The embodiments of the system can additionally provide that the user can utilize the data communications device 8 of the object 2 or the access point 9 to set parameters of the displacement device 3 of an object 2, for example a force required for displacing the partial object area 4, or a period of time used for deactivating the displacement device 3, an accuracy of the detection devices 5 that determines when a detection signal is recognized as a floor processing device 1 present in the detection area 6 of the respective detection device 5, or the like. As a whole, communication between the floor processing device 1 and the object 2 can thus take place directly or via a central access point 9 of the system, which is part of a home communications network that integrates the data communications devices 8 of the floor processing device 1 and object 2.

Although only a few embodiments of the present invention have been shown and described, it is to be understood that many changes and modifications may be made thereunto without departing from the spirit and scope of the invention.

REFERENCE LIST

1 Floor processing device
2 Object
3 Displacement device
4 Partial object area
5 Detection device
6 Detection area
7 Control device
8 Data communications device
9 Access point
10 Sensor
11 Navigation device

What is claimed is:

1. A system comprising:
a floor processing device,
an object located in an environment of the floor processing device, the object having a partial object area and a displacement device configured for automatically displacing the partial object area,
a detection device, which is configured for detecting a presence of the floor processing device in a detection area of the detection device, and
a control device configured for generating a control command for the displacement device as a function of a detection result of the detection device,
wherein the control command is configured for deactivating the displacement device, thereby preventing a displacement of the partial object area even if the floor processing device is present in the detection area,
wherein the floor processing device has a sensor for detecting objects in the environment of the floor processing device, and
wherein the control device is configured for using object data recorded by the sensor to determine whether the object has a displacement device, and in the event that the object has a displacement device, transmit a control command for deactivating the displacement device to the object.

2. The system according to claim 1, wherein the detection device is a detection device of the object.

3. The system according to claim 1, wherein the control device is a control device of the floor processing device.

4. The system according to claim 1, wherein the floor processing device and the object have corresponding data communications devices for wirelessly communicating with each other, and/or wherein the system has a communications network with an access point, wherein the access point and a data communications device of the floor processing device and/or object is set up to communicate with each other via a wireless communications link.

5. The system according to claim 1, wherein the object has a local access point, or wherein the system has a central access point, with which a data communications device of the floor processing device can be connected, so as to transmit a control command to the displacement device.

6. The system according to claim 1, wherein the control command contains a time allowance denoting a period of time for which the displacement device is deactivated.

7. The system according to claim 1, wherein the object is a door or a furniture item, and the partial object area is a door leaf, a flap, or a drawer.

8. The system according to claim 1, wherein the floor processing device is an automatically moving floor processing device, wherein the floor processing device has a navigation device which is configured to generate an area map based upon object data of detected objects.

* * * * *